United States Patent [19]

Tanizaki et al.

[11] Patent Number: 4,496,189
[45] Date of Patent: Jan. 29, 1985

[54] SEAT DEVICE

[75] Inventors: Hiroyuki Tanizaki; Sakae Ebihara, both of Yokohama; Akimitsu Hatanaka, Aichi; Takayoshi Ogawa, Ogaki; Yuzo Kanazawa, Yokohama, all of Japan

[73] Assignees: Nissan Motor Company, Limited, Yokohama; Aichi Machine Industry Company, Limited, Nagoya; Ikeda Bussan Company Limited, Yokohama, all of Japan

[21] Appl. No.: 409,879

[22] Filed: Aug. 20, 1982

[30] Foreign Application Priority Data

Aug. 22, 1981 [JP] Japan .................. 56-131885

[51] Int. Cl.³ .............................................. A47C 13/00
[52] U.S. Cl. ...................................... 297/63; 297/112; 297/233
[58] Field of Search ................. 297/233, 234, 63, 383, 297/112, 249, 350

[56] References Cited

U.S. PATENT DOCUMENTS

| 251,737 | 1/1882 | Schmitz | 297/112 X |
|---|---|---|---|
| 352,723 | 11/1886 | Weeden | 297/112 |
| 961,169 | 6/1910 | Shear | 297/233 X |
| 1,757,551 | 5/1930 | Souto et al. | 297/63 X |
| 1,895,803 | 1/1933 | Kohler | 297/63 X |
| 2,621,708 | 12/1952 | Luce, Jr. | 297/233 X |

Primary Examiner—Francis K. Zugel
Attorney, Agent, or Firm—Lane, Aitken & Kananen

[57] ABSTRACT

A seat device comprises a pair of main seat portions which can be turned backwards and arranged close to each other, a pair of main seat back portions projecting upwardly from the main seat portions, respectively, a pair of auxiliary seat portions attached to both sides of each main seat portion, and a pair of auxiliary seat back portion attached to both sides of each main seat back portion. All the auxiliary seat back portions and the seat portions are movable between an extended position and an unextended position. The seat device is suitable for use in a van type automotive vehicle.

5 Claims, 12 Drawing Figures 4,496,189

SEAT DEVICE

BACKGROUND OF THE INVENTION

This invention relates to a seat device which is suitable for use in an automotive vehicle.

FIG. 1 shows a conventional van type vehicle compartment arrangement. Arranged in a vehicle compartment 101 are a driver seat 102, an assistant seat 103, an intermediate seat 104 and a rear passenger seat 105. The seats 104, 105 are suitable for two or three passengers. The intermediate seat 104 can be turned backwards around the point P. When the intermediate seat 104 is backwards arranged, it faces the rear seat 105. For the purpose of turning the intermediate seat 104 around the point P, as shown in FIG. 1, a big space as defined by the circle R is required. For this reason, in this first case, the length of the intermediate seat 104 must be shortened so that only two passengers can sit on the intermediate seat 104.

FIG. 2 shows another conventional van type seat vehicle compartment arrangement. Arranged in a vehicle compartment 111 are a driver seat 112, an assistant seat 113, an intermediate seat 114 and a rear seat 115. The intermediate seat 114 is divided into two seat portions 114A, 114B. The seat portion 114A can be turned around the point P1. The other seat portion 114B can be turned around the point P2. However, only after the seat portion 114A is laterally moved to the position shown by the broken line can the seat portion 114B be turned. In this second case, the space R that is required for the purpose of turning the seat portion 114B makes lateral movement of the seat portion 114A necessary. Thus only two passengers can sit on the intermediate seat 114 consisting of two seat portions 114A and 114B.

SUMMARY OF THE INVENTION

According to this invention, a seat device includes two main seats and auxiliary seats which can together constitute a single seat for three passengers. An auxiliary seat is divided into an auxiliary seat portion and an auxiliary seat back portion. The auxiliary seat portion and the seat back portion can be moved between an extended position and an unextended position if desired. When all the auxiliary seat portions and the auxiliary seat back portions are in such an unextended position, they are received in the respective recesses of the main seat portions and the main seat back portions so that the auxiliary seat portions and the auxiliary seat back portions do not substantially protrude from the main seat portions and the main seat back portions. Thus, in such an unextended position, for instance, the two main seats can turn backwards even if they are relatively closes to each other. For such a reason, the space for turning the main seats can be minimized.

DETAILED DESCRIPTION OF PREFERRED EMBODIMENTS

Figure 1:
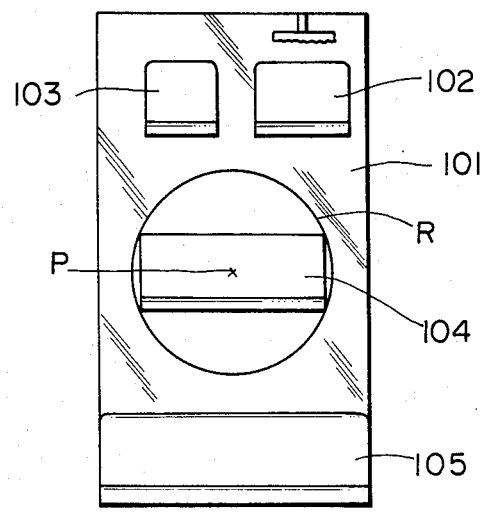
FIG. 1 shows a conventional van type automotive vehicle compartment in which a plurality of seats are arranged.
Figure 2:
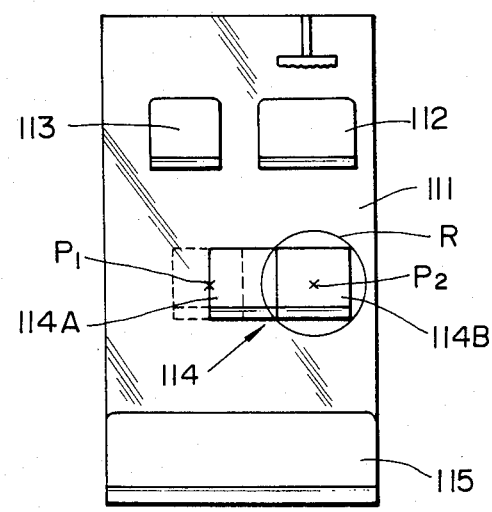
FIG. 2 shows another conventional van type vehicle compartment in which a plurality of seats are arranged.
Figure 3:
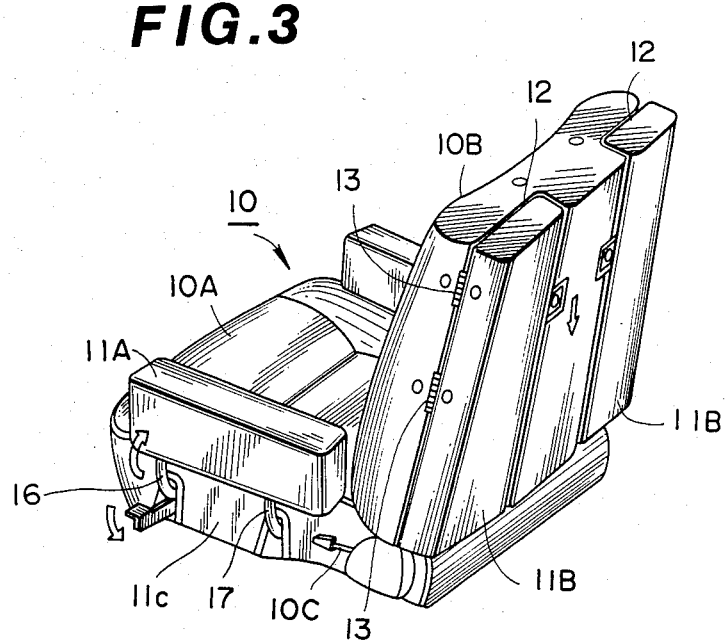
FIG. 3 is a perspective view showing a seat device according to this invention in which all auxiliary seats are in an unextended position.
Figure 4:
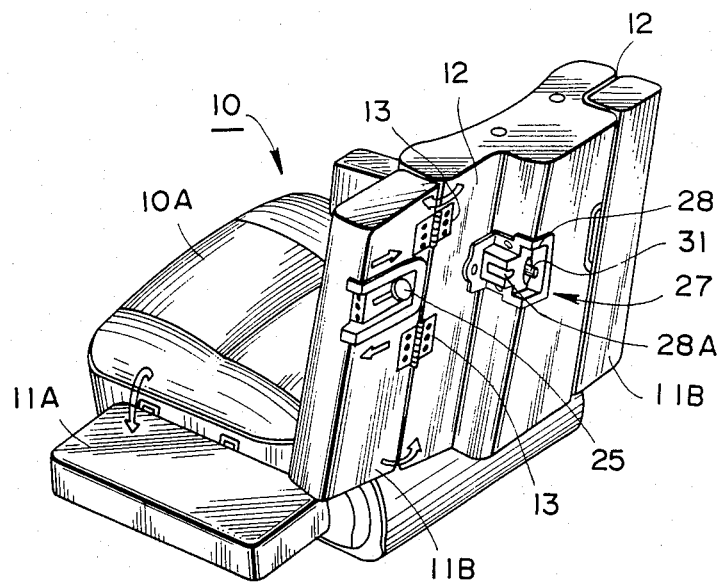
FIG. 4 is a perspective view showing the seat device shown in FIG. 3 in which all auxiliary seats are in an extended position.

Referring now to FIGS. 3 and 4, according to this invention, a seat device 10 includes a main seat portion 10A and a main seat back portion 10B. The main seat back portion 10B is designed of a reclining type. A lever 10C is placed at the rear end of the main seat portion 10A near the lower end of the main seat back portion 10B in a well-known manner. By operating the lever 10C, the main seat back portion 10B can be reclined so as to be set in a desired position.

A pair of auxiliary seat portions 11A are attached to the opposite sides of the main seat portion 10A in such a way that the auxiliary seat portions 11A can be independently developed.

FIG. 3 shows an unextended position in which the auxiliary seat portions 11A project upwardly or erect. In this position, the auxiliary seat portions 11A function as an arm rest.

FIG. 4 shows an extended position in which the auxiliary seat portions 11A are moved down in a horizontal position. In this position, the auxiliary seat portions 11A function as a seat portion like the main seat portion 10A.

A pair of auxiliary seat back portions 11B are attached to the opposite side portions of the main seat back 10B. Each side edge portion of the main seat back 10B is formed in a step shape at the backside thereof to make a recess 12. The auxiliary seat back portions 10B are received in the respective recesses 12. The auxiliary seat back portions 11B are attached by means of hinges 13 at an outer edge portion of the recess 12. The auxiliary seat backs 11B can move between the unextended position of FIG. 3 and the extended position of FIG. 4.

Figure 5:
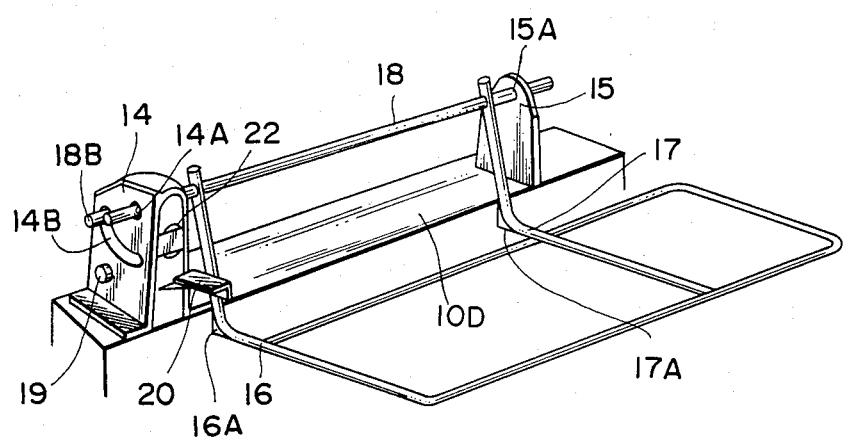
FIG. 5 is a schematic perspective view showing a mechanism for supporting an auxiliary seat portion of the seat device shown in FIG. 4.
Figure 6:
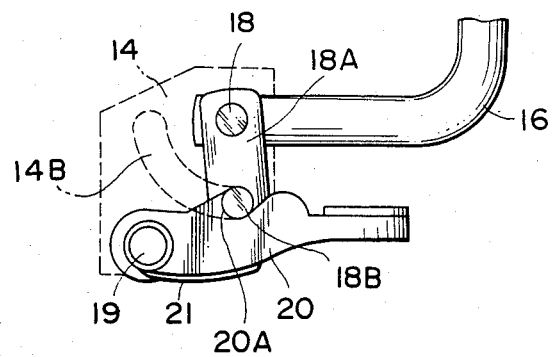
FIG. 6 is a side view showing a part of the support mechanism of FIG. 5 in an unextended position of an auxiliary seat back portion.

The auxiliary seat portion 11A is movable relative to and supported by the main seat portion 10A by means of a support mechanism as shown in FIGS. 5 and 6. A pair of brackets 14, 15 are fixed to the top surface of a frame 10D of the main seat portion 10A at both sides thereof. A shaft 18 is supported by the brackets 14, 15 in a horizontal position in such a manner that the shaft 18 is pivotal in the holes 14A, 15A of the brackets 14, 15. A pair of L-shaped rods 16, 17 are fixedly joined at the base portion thereof to the shaft 18. The L-shaped rods 16, 17 project from a frame 11C of the auxiliary seat portion 11A through its openings as shown in FIG. 3.

The bracket 14 is formed of a double structure consisting of an inner panel and an outer panel. The outer panel has a guide groove or opening 14B formed in an arc shape which is inclined. A pin 18B projecting from an arm 18A fixed to one end of the shaft 18 is movable along the guide opening 14B. A short shaft 19 is arranged between the inner and outer panels of the bracket 14 at a lower portion thereof. A stop lever 20 is rotatably supported by the shaft 19 at a base portion of the stop lever 20. A stop recess or groove 20A is formed in a shape corresponding to a lower portion of the pin 18B in an intermediate portion of the stop lever 20 at the upper edge thereof. A spring 21 biases the stop lever 20 counterclockwise. A rubber stop 22 stops the stop lever 20 in a predetermined position as shown in FIG. 5.

FIG. 6 shows a position in which the auxiliary seat portion 11A is erected. The pin 18B together with the shaft 18 is stopped by the stop lever 20 when the pin 18B is properly received in the recess 20A of the stop lever 20.

Figure 7:
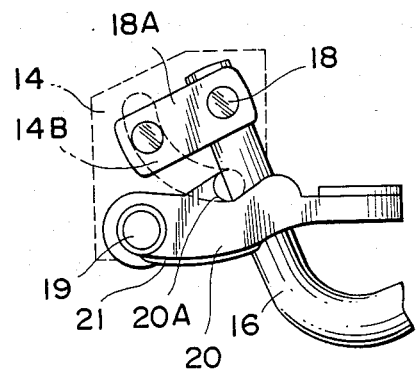
FIG. 7 is a side view which shows the support mechanism of FIG. 5, corresponding to FIG. 6 and a position just before the auxiliary seat portion is completely extended.

FIG. 7 shows a position just before the auxiliary seat portion is completely extended. If the stop lever 20 is clockwise moved against the biasing force of the spring 21, the pin 18B becomes disengaged from the recess 20A of the stop lever 20. Thus, the pin 18B can freely move along the guide opening 14B so that the shaft 18 can rotate together with the rods 16, 17 and the auxiliary seat portion 11A. When the auxiliary seat portion 11A comes down in a horizontal position, i.e., in an extended position, the pin 18B abuts against the upper end of the guide groove 14B. In this position, the frame 10D of the main seat portion 10A also supports a pair of stop members 16A, 17A (FIG. 5) which project from the curved portions of the L-shaped rods 16, 17 whereby the auxiliary seat portion 11A is enforced or stabilized when a passenger sits thereon.

Figure 8:
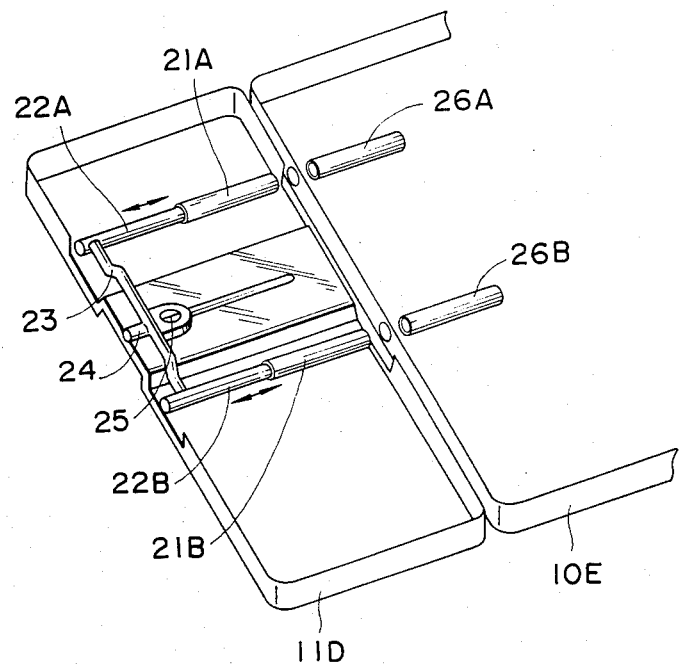
FIG. 8 is a perspective view showing in an extended position a mechanism for supporting an auxiliary seat back portion of the seat device shown in FIG. 4.

Referring to FIG. 8, the auxiliary seat back portion 11B has a frame 11D to which a pair of pipes 21A, 21B are fixed. A pair of locking pipes 22A, 22B are slidably attached into the fixed pipes 21A, 21B along the axis thereof at an inner portion of the pipes 22A, 22B. A rod 23 is fixed between and to the outer ends of the pipes 22A, 22B. A pin 24 is fixed to a central portion of the rod 23 and projects outwardly from a side edge of the auxiliary seat back portion 11B. A handle 25 is fixed to a central portion of the rod 23 at the inner side thereof and projects from the back of the main seat back portion 10B so that a passenger or the like can easily hold it in order to move the locking pipes 22A, 22B along the fixed pipes 21A, 21B into or out of a pair of pipes 26A, 26B which are fixed to a frame 10E of the main seat back portion 10B. The locking pipes 22A, 22B at the side of the auxiliary seat back portion 11B can be slidably inserted into the corresponding pipes 26A, 26B at the side of the main seat back portion 10B, respectively, whereby the auxiliary seat back 11B can be locked in a position shown in FIG. 4.

A locking mechanism 27 is attached to an edge portion of the recess 12 of the main seat back portion 10B for locking the pin 24 of the auxiliary seat back portion 11B, as shown in FIG. 4.

Figure 9:
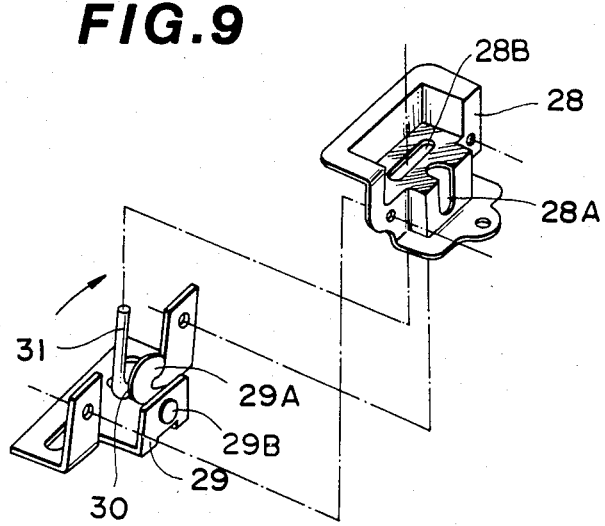
FIG. 9 is a perspective disassembled view showing a lock mechanism for the auxiliary seat back portion of FIG. 8.

As shown in FIG. 9, the locking mechanism 27 includes a cover 28 and a body 29. The cover 28 has a groove or opening 28A through which the pin 24 is to penetrate and a slot 28B through which a lever penetrates. The body 29 has a piece 29A which is adapted to engage the pin 24 and rotatable around a pin 29B. The engaging piece 29A is biased in the direction of the arrow in FIG. 9 by means of a spring 30 to lock the pin 24. The lever 31 is fixed to the engaging piece 29A so that the former moves integrally with the latter in order to release the pin 24.

Accordingly, when the auxiliary seat back portion 11B is received in the recess 12 of the main seat back portion 10B as shown in FIG. 3, the pin 24 of the auxiliary seat back portion 11B is inserted into the opening 28A of the locking mechanism 27 and engages the engaging piece 29A so that the pin 24 is automatically locked by the locking mechanism 27. Such a locked condition remains by means of the spring 30.

If the lever 31 is moved in the opposite direction to the arrow in FIG. 9 by a passenger, the pin 24 becomes disengaged from the engaging piece 29A. Thus, the auxiliary seat back portion 11B can be freely developed as shown in FIG. 4.

As can be seen from the foregoing, the auxiliary seat portions 11A and the auxiliary seat back portions 11B can be selectively folded as in FIG. 3 or developed as in FIG. 4 if desired.

Figure 10A:
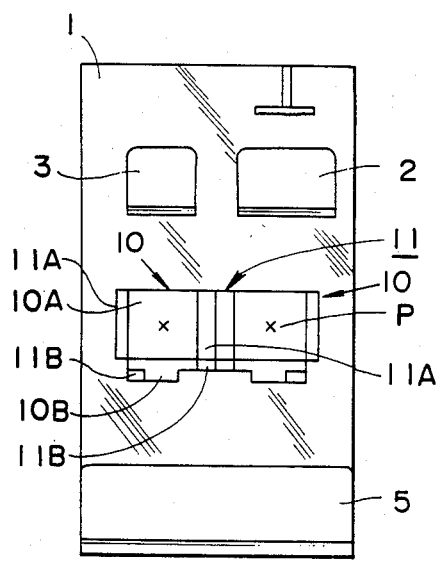
FIG. 10(a) is a plan view schematically showing one mode of a vehicle compartment arrangement in which a pair of seat devices according to this invention are used.

FIG. 10(a) shows a van type vehicle compartment arrangement in which two seat devices accroding to this invention are used. Within a vehicle compartment 1, a driver seat 2, an assistant seat 3, two intermediate seats 10 and a rear seat 5 are arranged on the floor thereof. The intermediate seats 10 are formed according to this invention and positioned close to each other in such a manner that they can constitute one seat 11 consisting of one continuous seat portion and one continuous seat back portion projecting upwardly therefrom when the auxiliary seat portions 11A and the auxiliary seat back portions 11B are completely developed at the inner side thereof. In such a position, three passengers can sit on the two intermediate seats 10.

Figure 10B:
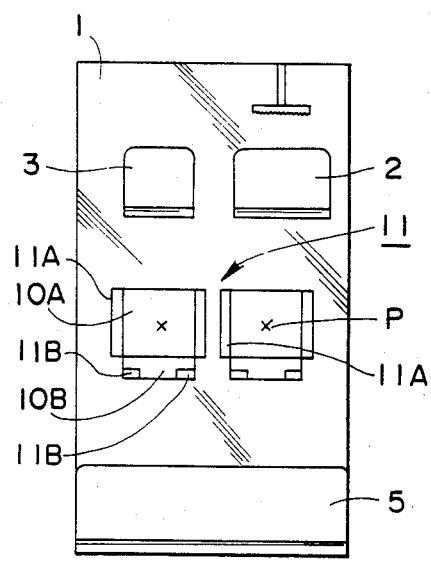
FIG. 10(b) is a schematic plan view showing another mode of the vehicle compartment arrangement of FIG. 10(a)

FIG. 10(b) shows the same van type vehicle compartment but a different arrangement in which all the auxiliary seat portions 11A and the auxiliary seat back portions 11B are folded. In such a position, the auxiliary seat portions 11A function as an arm rest.

Figure 11:
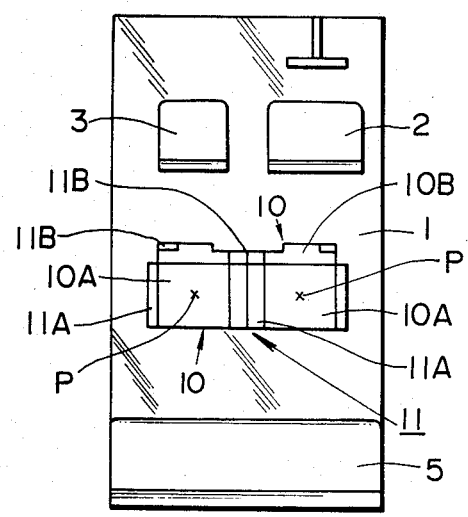
FIG. 11 shows still another mode of the vehicle compartment arrangement of FIG. 10(a) according to this invention.

If the intermediate seats 10 are turned around the points P from the position of FIG. 10(b), respectively, they face the rear seat 5. Thereafter the auxiliary seat portions 11A and the auxiliary seat back portions 11B at the inside thereof are developed as shown in FIG. 11. In such a position, three passengers can sit on the two intermediate seats 10.

Although the preferred embodiments of this invention have been described, this invention is not limited thereto. For instance, an auxiliary seat portion and an auxiliary seat back portion can be designed to be slidably extended from a seat portion and a seat back portion, respectively, in place of the above-stated embodiments in which they are folded or developed.

What is claimed is:

1. In a van type automotive vehicle an arrangement comprising:

a vehicle compartment;

a floor formed in the bottom of the vehicle compartment;

a driver seat arranged at a front portion of the vehicle compartment on the floor;

a rear seat arranged on the floor at a rear portion of the vehicle compartment;

two seat devices adjacently arranged side by-side in an intermediate position between the driver seat and the rear seat in the vehicle compartment;

each seat device including:

a main seat portion pivotally mounted about a vertical axis to be selectively set in a forward facing position or a rearward facing position thereof by turning it about said axis;

a main seat back portion projecting upwardly from a rear edge portion of the main seat portion;

a pair of auxiliary seat portions attached to both sides of the main seat portion, the auxiliary seat portions being movable between an extended position and an unextended position in such a manner that, when the auxiliary seat portions are in the extended position, the auxiliary seat portions extend laterally from each main seat portion, said auxiliary seat portions thereby forming a continuous generally planar seat portion in combination with said main seat portions, and when the auxiliary seat portions are in the unextended position, the auxiliary seat portions do not substantially protrude from the main seat portion;

a pair of auxiliary seat back portions attached to both sides of the main seat back portion, the auxiliary seat back portions being movable between an extended position and an unextended position in such a manner that, when the auxiliary seat back portions are in the extended position, the auxiliary seat back portions extend laterally from each main seat back portion, said auxiliary seat back portions thereby forming a continuous generally planar seat back portion in combination with said main seat back portions, and when the auxiliary seat back portions are in the unextended position, the auxiliary seat back portions do not substantially protrude from the main seat back portion.

2. The seat device of claim 1, wherein the main seat back portion is formed in a reclining type.

3. The seat device of claim 1, wherein the auxiliary seat portion is supported by the main seat portion by means of a support mechanism.

4. The seat device of claim 3 wherein the auxiliary seat portion can be erected in the unextended position by means of the supporting means so as to function as an arm rest.

5. The seat device of claim 1, wherein the auxiliary seat portion is received in a recess formed in a step shape at each side edge portion of the main seat back portion in the unextended position and locked by means of a pipe assembly in the extended position.

* * * * *